United States Patent [19]

Smith

[11] Patent Number: 5,887,574

[45] Date of Patent: Mar. 30, 1999

[54] LIQUID FUEL INJECTION SYSTEM

[75] Inventor: Rodney Sinclair Smith, Echunga, Australia

[73] Assignee: Energy Research and Development Corporation, Australian Capital Territory, Australia

[21] Appl. No.: 945,990

[22] PCT Filed: May 6, 1996

[86] PCT No.: PCT/AU96/00271

§ 371 Date: Nov. 10, 1997

§ 102(e) Date: Nov. 10, 1997

[87] PCT Pub. No.: WO96/35863

PCT Pub. Date: Nov. 14, 1996

[30] Foreign Application Priority Data

May 9, 1995 [AU] Australia .................................. PN2860

[51] Int. Cl.$^6$ .................................................. F02M 21/04
[52] U.S. Cl. ............................................................ 123/527
[58] Field of Search .................................. 123/525, 527, 123/456; 48/144, 180.1

[56] References Cited

U.S. PATENT DOCUMENTS 5,291,869  3/1994  Bennett ..................................... 123/527

FOREIGN PATENT DOCUMENTS

16738/83  1/1985  Australia .
61824/94  11/1994  Australia .

Primary Examiner—Thomas N. Moulis
Attorney, Agent, or Firm—Evenson, McKeown, Edwards & Lenahan, P.L.L.C.

[57] ABSTRACT

A fuel injection system for injecting liquid LPG or CNG into an air inlet duct of an internal combustion engine. The fuel injection system including an adaptor ring which is adapted to be mounted into the air intake duct for the engine upstream or downstream of the throttle valve in the inlet duct so as to allow air flow through. There is at least one pod mounted into the adaptor ring with each pod including a fuel inlet, a fuel outlet and a hollow space within the pod into which the fuel inlet and fuel outlet open and a liquid fuel injector mounted into the or each pod. Fuel enters the injector from the hollow space within the pod to be injected therefrom into the inlet duct. An injector control arrangement acting upon engine parameters and demand parameters controls the or each injector to inject liquid fuel into the engine as required. Each of the injectors may be bottom feed flow-through injectors.

12 Claims, 3 Drawing Sheets

LIQUID FUEL INJECTION SYSTEM

FIELD OF INVENTION

This invention relates to a system for injection of liquid fuel into an internal combustion engine and more particularly to injection of a low boiling point liquid into such engines.

The invention is particularly directed towards the injection of Liquefied Petroleum Gas (LPG) or Compressed Natural Gas (CNG) into internal combustion engines.

BACKGROUND OF THE INVENTION

A problem with such fuels when used in a liquid state is that because of their very low boiling point they will tend to vaporise in fuel lines unless a sufficient pressure over the vapour pressure at any expected temperature is provided.

In Australian Patent No. 647561 a fuel injection system is disclosed in which liquid LPG is injected into an inlet manifold adjacent to the engine. This region of the engine can get very hot and as such even with excess flow of fuel there can be a problem with vaporisation of fuel. It is desirable therefore that easily vaporisable fuels are injected some distance away from the engine.

It is an object of this invention to provide a fuel injection system for such fuels and in one particular embodiment to modify an internal combustion engine fuelling system adapted to operate on injected petrol so that it can also operate on LPG or CNG liquid injection.

The invention, however, is not particularly directed to this adaptation but is generally directed to a modified fuel injection system.

BRIEF DESCRIPTION OF THE INVENTION

In one form therefore the invention is said to reside in a fuel injection system for injecting liquid LPG or CNG into an air inlet duct of an internal combustion engine, the fuel injection system including an adaptor ring which is adapted to be mounted into the air intake duct for the engine upstream or downstream of the throttle valve in the inlet duct so as to allow air flow therethrough, at least one pod mounted into the adaptor ring, each pod including a fuel inlet, a fuel outlet and a hollow space within the pod into which the fuel inlet and fuel outlet open and a liquid fuel injector sealably mounted into the or each pod, liquid fuel supply lines to the pod and from the pod and means to allow fuel to enter the injector from the hollow space within the pod to be injected therefrom into the inlet duct and an injector control arrangement acting upon engine parameters and demand parameters to control the or each injector to inject liquid fuel into the engine as required.

It will be noted that in this embodiment the LPG or CNG is injected into the inlet manifold near the throttle valve which is at some distance from the actual engine. This has two particular advantages.

First of all the region of injection is not such a hot part of the engine compartment as the engine block so that the injectors and the fuel lines can be placed further away from the engine and therefore do not get so much heating and avoid the heat soak conditions which may cause vaporisation.

A second advantage is that by injecting the fuel some distance from the engine and allowing it to flow past the throttle valve along the inlet manifolds to the various inlet valves of the engine a greater time is allowed for full vaporisation of the fuel which in turn will allow better combustion.

A third advantage is that there is considerable simplicity of installation of such a system where it is not necessary to modify the inlet manifold to any great extent nor touch other injectors such as petrol injectors already existing on the engine. It is only necessary to mount the adaptor ring into the air intake duct either before or after the throttle valve.

It will be noted that such a system can be fitted to an engine at the time of manufacture or may be fitted later.

The or each pod may comprise a body having a top, a bottom, at least one side and an aperture extending through the body from the top to the bottom, the fuel inlet and the fuel outlet being on the side of the pod and the aperture defining the hollow space within the pod into which the fuel inlet and fuel outlet open, the opening of the aperture at the top being larger than the opening of the aperture at the bottom and the bottom including connection means to enable the pod to be mounted into the adaptor ring.

The connection means to enable the pod to be mounted into the adaptor ring comprises a screw threaded extension of the body.

The injector may be sealably engaged within the body by means of O rings in the aperture adjacent the top and bottom of the body.

The or each of the injectors may be bottom feed injectors and flow-through injectors. These have the particular advantage that with the use of an excess flow of fuel around the lower part of the injector it may be maintained at a temperature at which vaporisation will not occur In one preferred embodiment of the invention the engine may be a dual fuel engine with a separate petrol injection system having its own injectors and fuel rail system and its own electronic control unit acting upon engine parameters and demand parameters to calculate petrol injection times and the LPG or CNG injection system having a separate electronic control unit which uses the same engine parameters and demand parameters to calculate LPG or CNG injection times. Alternatively the LPG or CNG injection system may use the same electronic control unit which is used by the petrol or other fuel injection system.

In one form of the invention the LPG or CNG may be operated at a fixed pressure sufficiently higher above the expected vapour pressure of the gas at any expected temperature in the engine system that it does not vaporise until it has been injected. This system however has disadvantages in that a high pressure pump is required to operate it which is energetically unfavourable.

In an alternative embodiment the LPG or CNG may be operated at a selected fixed pressure above the vapour pressure of the fuel in a fuel tank. The selected fixed pressure may be selected for rise in temperature between the temperature in the tank and any expected temperature in the fuel lines or injectors so that once again the LPG or CNG does not vaporise until required.

The control of the LPG injector therefore includes a parameter to determine the absolute pressure of the fuel to modify the injection time. Preferably also the temperature of the fuel is measured so that a better allowance is made for change of density at various temperatures.

It will be noted that one of the features of this invention is that there is one injector in one pod but for engines with greater numbers of cylinders there may be multiple pods each with one injector. Such pods may be placed in series or in parallel on the fuel lines and can be for instance mounted a number onto one adaptor ring through which intake air flows to inject into the inlet manifold upstream or downstream of the throttle valve. There may be more than one adaptor ring and may have injectors controlling more than one type of fuel on any one ring.

Under certain conditions there may be some problem with icing up of injectors using CNG or LPG and hence under these conditions some form of heating may be required. Such heating may be provided by electrical heating coils or by a suitable flow of engine coolant around the pods.

This then generally describes the invention but to assist with understanding the invention reference will now be made to the accompanying drawings which show preferred embodiments of the invention.

DETAILED DESCRIPTION OF THE DRAWINGS

Figure 1:
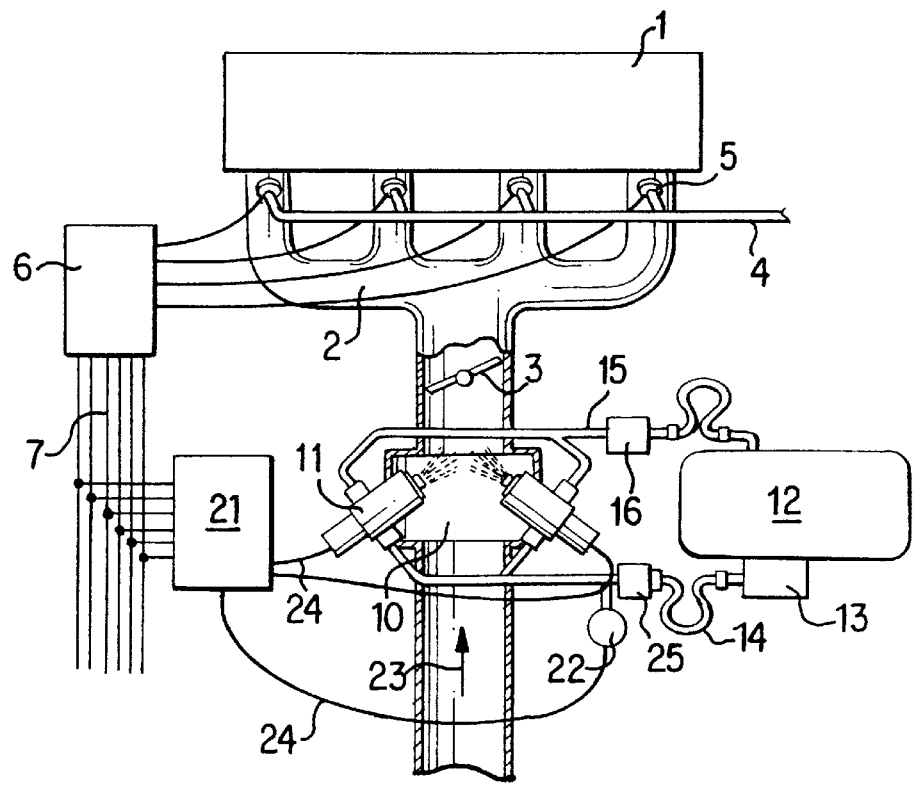
FIG. 1 shows a stylised engine fuel injection and control system of one embodiment of the present invention.

Now looking more closely at the drawings and in particular FIG. 1 it will be seen that the engine 1 has an inlet manifold 2 which takes air from the engine past a throttle valve 3 in the direction shown by the arrow 23. In this embodiment the engine is one of a type which is normally adapted for petrol injection although as discussed above this invention may be applied to non fuel injection engines such as carburettor operated engines. The normal fuel supply system for the engine includes a petrol fuel rail 4, petrol fuel injectors 5 and an electronic control unit 6 to calculate petrol injection times from engine control and demand parameter lines 7. Such control and demand parameters may be air and engine temperature, running conditions such as engine speed, acceleration, manifold pressure and exhaust temperature and oxygen concentration.

To add LPG injection according to the present invention to such a system there is included an adaptor ring 10 which is placed as a portion of the inlet manifold in this embodiment upstream of the throttle valve 3. A required number of fuel injection pods 11 are mounted into the adaptor ring 10. In this embodiment the pods are fed liquid LPG in parallel from an LPG tank 12 via a solenoid valve 25. The LPG is pumped up to a fixed pressure above the vapour pressure of the fuel in the tank 12 by a pump 13 and then transferred along LPG inlet valve 14 to each pod 11. An LPG return rail 15 takes fuel from each pod 11 via a LPG pressure regulator 16 and back to the LPG tank 12. A considerable excess flow of LPG over that required for injection is provided to maintain cooling of the pods 11 and hence the injectors 20 within the pods. The injectors 20 in each pod 11 are controlled by means of a LPG electronic control unit 21 by control lines 24. This LPG electronic control unit 21 takes an input from the same engine demand perimeter lines as used by the petrol electronic control unit 6. The LPG electronic control unit has a further parameter which takes a reading from a pressure sensor 22 which reads the absolute pressure in the LPG inlet rail 14.

To operate the auxiliary fuel injection system of this embodiment of the present invention using LPG or CNG the electronic control unit 6 which controls the petrol injector is deactivated and the electronic control unit 21 is activated. The electronic control unit 21 activates the valve 25 to allow liquid LPG or CNG fuel flow and the LPG or CNG pump 13 to raise the LPG or CNG to the required pressure. The selected pressure is maintained above the vapour pressure in the tank by means of the LPG regulator 16. When operation with the auxiliary fuel is required fuel injection through the injectors 5 is stopped and the electronic control unit 21 activates the valve 25 the pump 13 and the injectors 20 in the pods 11 to inject LPG or CNG at a position remote from the engine adjacent the throttle valve 3.

Figure 2:
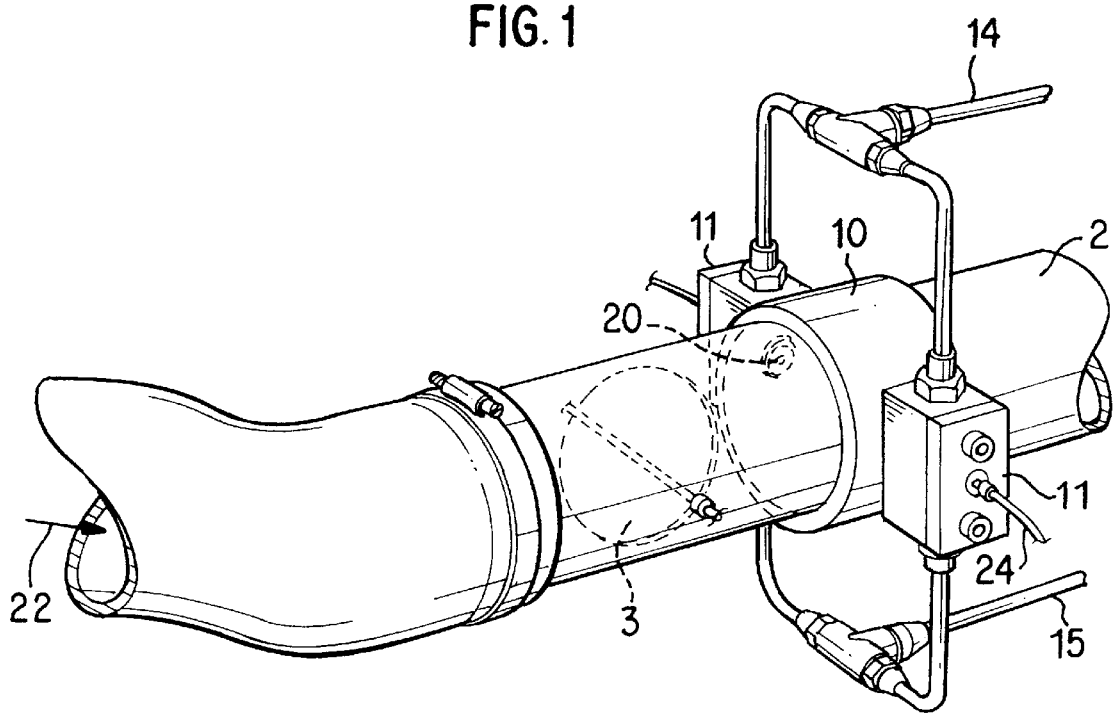
FIG. 2 shows a part cut away view of an inlet manifold including an adaptor ring of one embodiment of the present invention.
Figure 3:
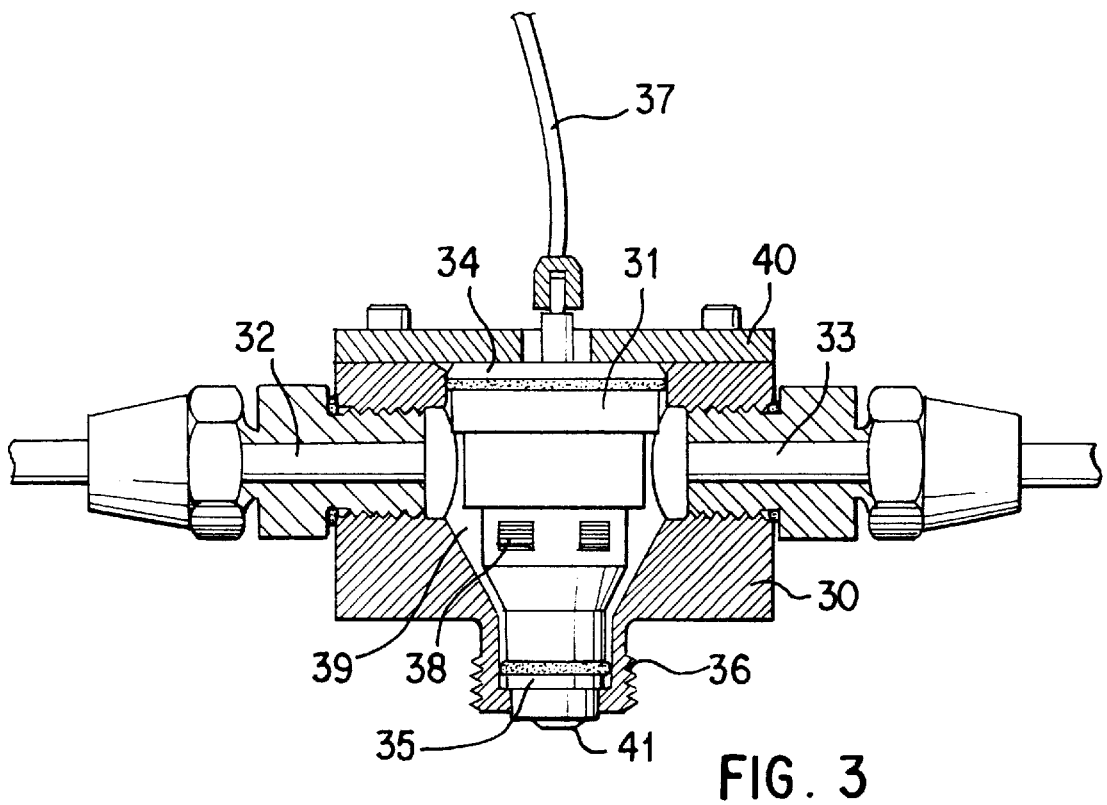
FIG. 3 shows a cross sectional view of an injector pod of one embodiment of the present invention.
Figure 4:
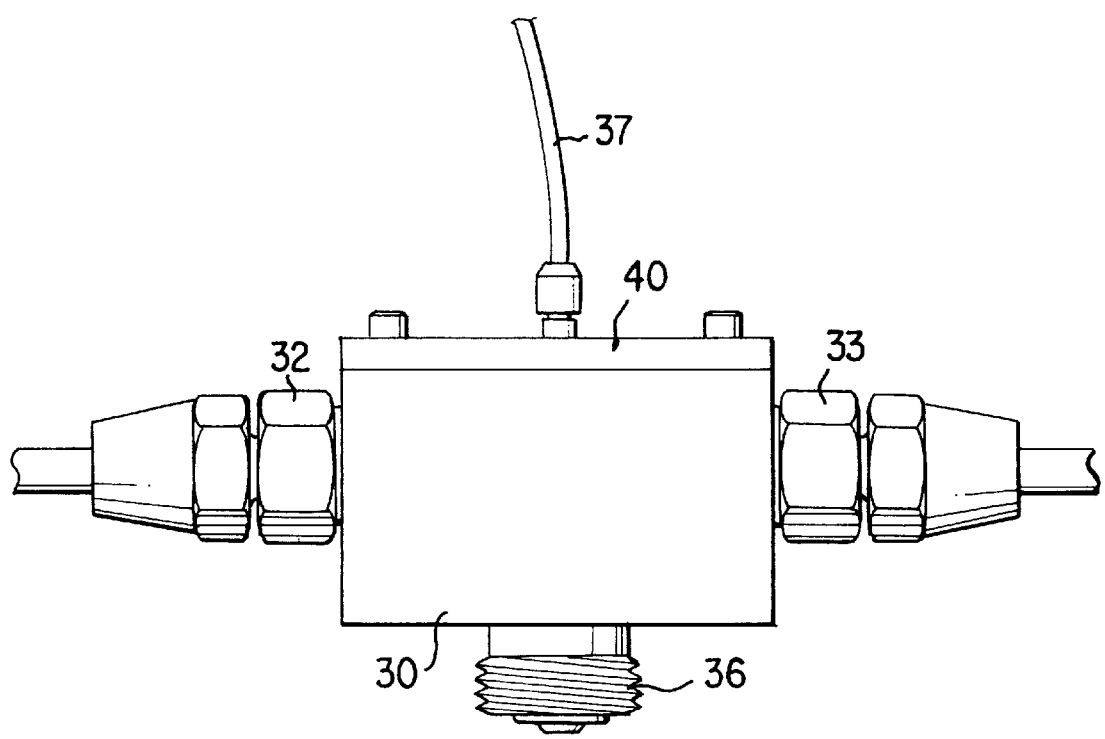
FIG. 4 shows an outside view of the injection pod of FIG. 3.

FIG's 3 and 4 shows view of a pod of the fuel injection system according to one embodiment of the present invention. The pod 30 has an injector 31 mounted into it with a retaining plate 40 holding the injector in place and with O rings 34 at the top of the injector and 35 at the bottom of the injector providing pressure sealing for the injector within the pod. The pod 30 has an LPG fuel inlet 32 and an LPG fuel outlet 33 and enough space within the pod around the injector 31 to enable a flow of LPG or CNG around the injector to keep the injector cool and to prevent vaporisation of fuel within the injector or within the pod. The liquid CNG or LPG actually enters the injectors 31 from the space 39 within the pod 30 through the openings 38 low down on the injector. Hence this style of injector is referred to as a bottom feed injector and as liquid fuel can flow through and past the injector it is know as a flow through injector. A thread 36 on the lower end of the pod enables it to be screwed into the adaptor ring 10 as shown in FIG. 1 and FIG. 2 and the tip of the injector 41 extends out through the aperture to enable fuel injection. An electronic control line 37 provides an activation signal for the electromagnetic operation of the injector 31 to inject fuel.

Figure 5:
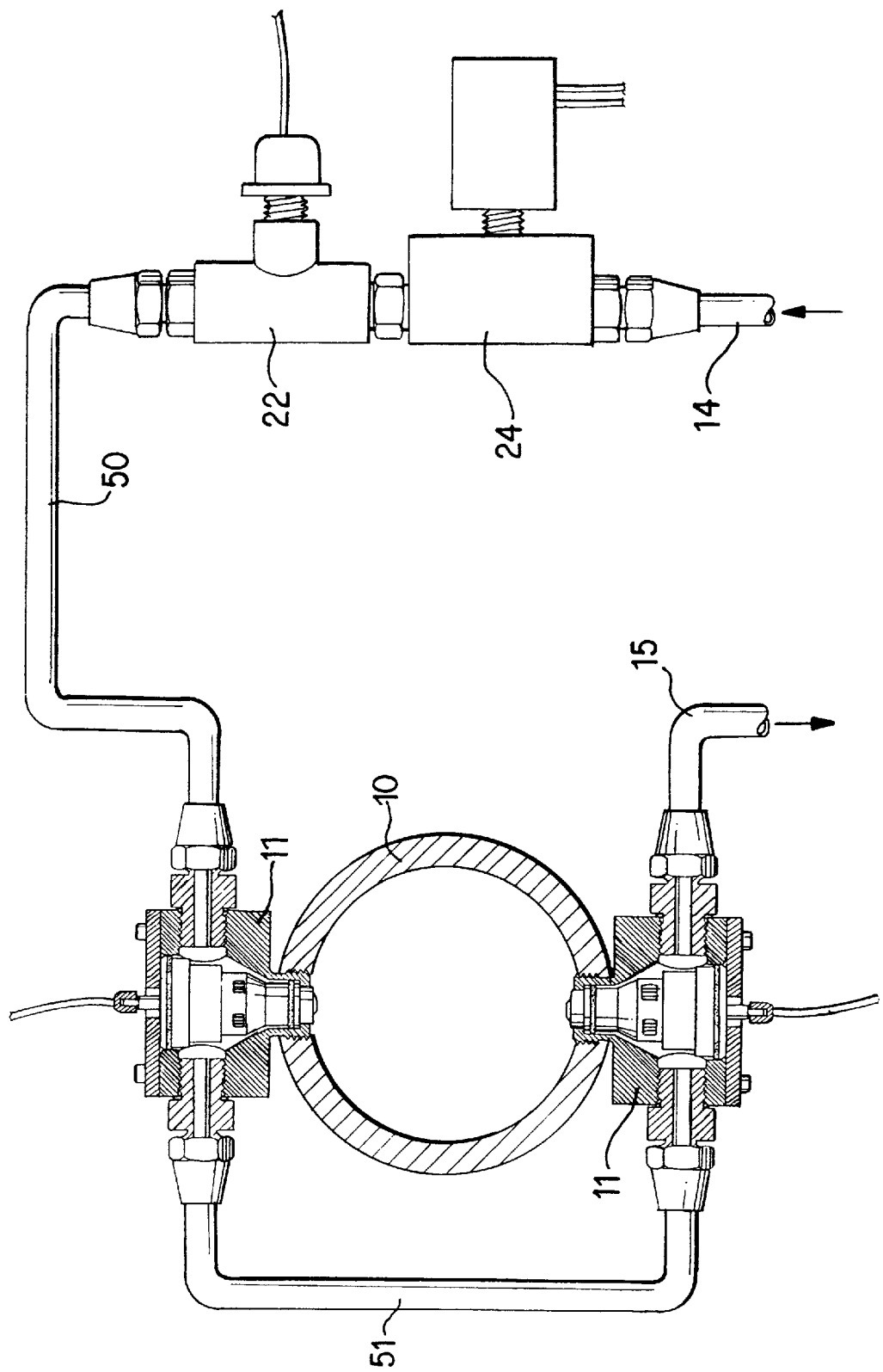
FIG. 5 shows a detailed view of a pair of injector pods and an adaptor ring and associated piping of one embodiment of the present invention.

FIG. 5 shows and alternative embodiment of fuel injection according to this invention. Those parts with the same function as in the embodiment shown in FIG. 1 has been given the same reference numerals. Fuel is supplied via pipe 14 from a fuel tank (not shown) to a solenoid valve 24 which is opened when LPG or CNG injection is required fuel then flows through pressure sensor 22 before flowing through fuel line 50 to a first injector pod 11. Excess flow from the first injection passes along fuel injection line 51 to a second injection pod 11 and excess flow beyond that flows through line 15 back to the fuel tank via the pressure regulator (not shown).

The construction and operation of each of the injector pods 11 is the same as that shown and described with respect to FIG's 3 and 4.

It will be seen that by this invention there is shown a fuel injection system which by injection of a high vapour pressure fuel some distance from the engine enables the fuel to be maintained in a liquid state for accurate and reproducible injection.

Throughout this specification unless the context requires otherwise, the words 'comprise' and 'include' and variations such as 'comprising' and 'including' will be understood to imply the inclusion of a stated integer or group of integers but not the exclusion of any other integer or group of integers.

I claim:

1. A fuel injection system for injecting liquid LPG or CNG into an air inlet duct of an internal combustion engine, the fuel injection system including an adaptor ring which is adapted to be mounted into the air intake duct for the engine upstream or downstream of the throttle valve in the inlet duct so as to allow air flow therethrough, at least one pod mounted into the adaptor ring, each pod including a fuel inlet, a fuel outlet and a hollow space within the pod into which the fuel inlet and fuel outlet open and a liquid fuel injector sealably mounted into the or each pod, liquid fuel supply lines to the pod and from the pod and means to allow fuel to enter the injector from the hollow space within the pod to be injected therefrom into the inlet duct and an injector control arrangement acting upon engine parameters and demand parameters to control the or each injector to inject liquid fuel into the engine as required.

2. A fuel injection system as in claim 1 wherein the or each pod comprises a body having a top, a bottom, at least one side and an aperture extending through the body from the top to the bottom, the fuel inlet and the fuel outlet being on the side of the pod and the aperture defining the hollow space within the pod into which the fuel inlet and fuel outlet open, the opening of the aperture at the top being larger than the opening of the aperture at the bottom and the bottom including connection means to enable the pod to be mounted into the adaptor ring.

3. A fuel injection system as in claim 2 wherein the connection means to enable the pod to be mounted into the adaptor ring comprises a screw threaded extension of the body.

4. A fuel injection system as in claim 2 wherein the injector is sealably engaged within the body by means of O rings in the aperture adjacent the top and bottom of the body.

5. A fuel injection system as in claim 1 wherein the or each of the injectors are bottom feed injectors.

6. A fuel injection system as in claim 1 wherein the or each of the injectors are flow-through injectors.

7. A fuel injection system as in claim 1 wherein the engine is a dual fuel engine with a separate petrol injection system having its own injectors and fuel rail system and its own electronic control unit acting upon engine parameters and demand parameters to calculate petrol injection times and the LPG or CNG injection system having a separate electronic control unit which uses the same engine parameters and demand parameters to calculate LPG or CNG injection times.

8. A fuel injection system as in claim 1 wherein the engine is a dual fuel engine with a separate petrol injection system having its own injectors and fuel rail system and an electronic control unit acting upon engine parameters and demand parameters to calculate both petrol injection times and LPG or CNG injection times.

9. A fuel injection system as in claim 1 wherein the LPG or CNG is operated at a fixed pressure sufficiently higher above the expected vapour pressure of the gas at any expected temperature in the engine system that it does not vaporise until it has been injected.

10. A fuel injection system as in claim 1 wherein the LPG or CNG is operated at a selected fixed pressure above the vapour pressure of the fuel in a fuel tank.

11. A fuel injection system as in claim 1, the or each pod including heating means to prevent icing of the injector or injectors.

12. A method for injecting liquid fuel into an air inlet duct of an internal combustion engine, comprising the steps of:

mounting an adapter ring in the air inlet duct of the internal combustion engine upstream or downstream of a throttle valve in the inlet duct so as to allow air flow therethrough;

mounting at least one pod in the adapter ring, each said pod including a fuel inlet and defining a hollow space within the pod with which the fuel inlet is communicated;

mounting a liquid fuel injector into each said pod, said injector being communicated with each of said hollow space and said air inlet duct; and controlling each said injector to inject liquid fuel into the air inlet duct as a function of at least one of engine parameters and demand parameters.

* * * * *